(12) United States Patent
Chen et al.

(10) Patent No.: US 6,920,520 B2
(45) Date of Patent: Jul. 19, 2005

(54) METHODS AND CIRCUITS FOR STACKING BUS ARCHITECTURE

(75) Inventors: Xi Chen, Fremond, CA (US); Brian Chang, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 670 days.

(21) Appl. No.: 09/833,670

(22) Filed: Apr. 13, 2001

(65) Prior Publication Data

US 2001/0032283 A1 Oct. 18, 2001

Related U.S. Application Data

(63) Continuation-in-part of application No. 09/416,365, filed on Oct. 8, 1999, now abandoned.
(60) Provisional application No. 60/103,813, filed on Oct. 8, 1998.

(51) Int. Cl.[7] .................................................. H04J 1/10
(52) U.S. Cl. .................................... 710/306; 370/492
(58) Field of Search ................. 710/306; 398/173; 178/70 R; 370/274, 279, 293, 360, 492

(56) References Cited

U.S. PATENT DOCUMENTS

| | | | | |
|---|---|---|---|---|
| 4,638,311 A | * | 1/1987 | Gerety | 370/447 |
| 5,249,183 A | * | 9/1993 | Wong et al. | 370/228 |
| 5,301,303 A | * | 4/1994 | Abraham et al. | 709/223 |
| 5,636,214 A | * | 6/1997 | Kranzler et al. | 370/438 |
| 5,671,249 A | * | 9/1997 | Andersson et al. | 375/211 |
| 5,777,567 A | * | 7/1998 | Murata et al. | 341/100 |
| 5,854,790 A | * | 12/1998 | Scott et al. | 370/401 |
| 5,961,646 A | | 10/1999 | Sokol | 713/162 |
| 5,963,719 A | | 10/1999 | Fite, Jr. et al. | 709/243 |
| 5,978,383 A | * | 11/1999 | Molle | 370/445 |
| 5,991,303 A | | 11/1999 | Mills | 370/402 |
| 6,041,065 A | * | 3/2000 | Melvin | 370/492 |
| 6,067,585 A | * | 5/2000 | Hoang | 710/11 |
| 6,092,214 A | * | 7/2000 | Quoc et al. | 714/4 |
| 6,115,391 A | | 9/2000 | Sokol | 370/445 |
| 6,167,403 A | * | 12/2000 | Whitmire et al. | 707/10 |
| 6,178,176 B1 | * | 1/2001 | Voloshin et al. | 370/438 |
| 6,373,840 B1 | * | 4/2002 | Chen | 370/360 |
| 6,396,841 B1 | * | 5/2002 | Co et al. | 370/401 |
| 6,459,700 B1 | * | 10/2002 | Hoang | 370/401 |

\* cited by examiner

*Primary Examiner*—Paul R. Myers
(74) *Attorney, Agent, or Firm*—Squire, Sanders & Dempsey L.L.P.

(57) ABSTRACT

A system for connecting multiple repeaters into a single collision domain comprising a first repeater, a second repeater and a stacking bus. The first repeater has a plurality of network ports. The second repeater also has a plurality of network ports. The stacking bus connects the first repeater and the second repeater and is configured to relay status signals between the first and said second repeaters.

43 Claims, 11 Drawing Sheets

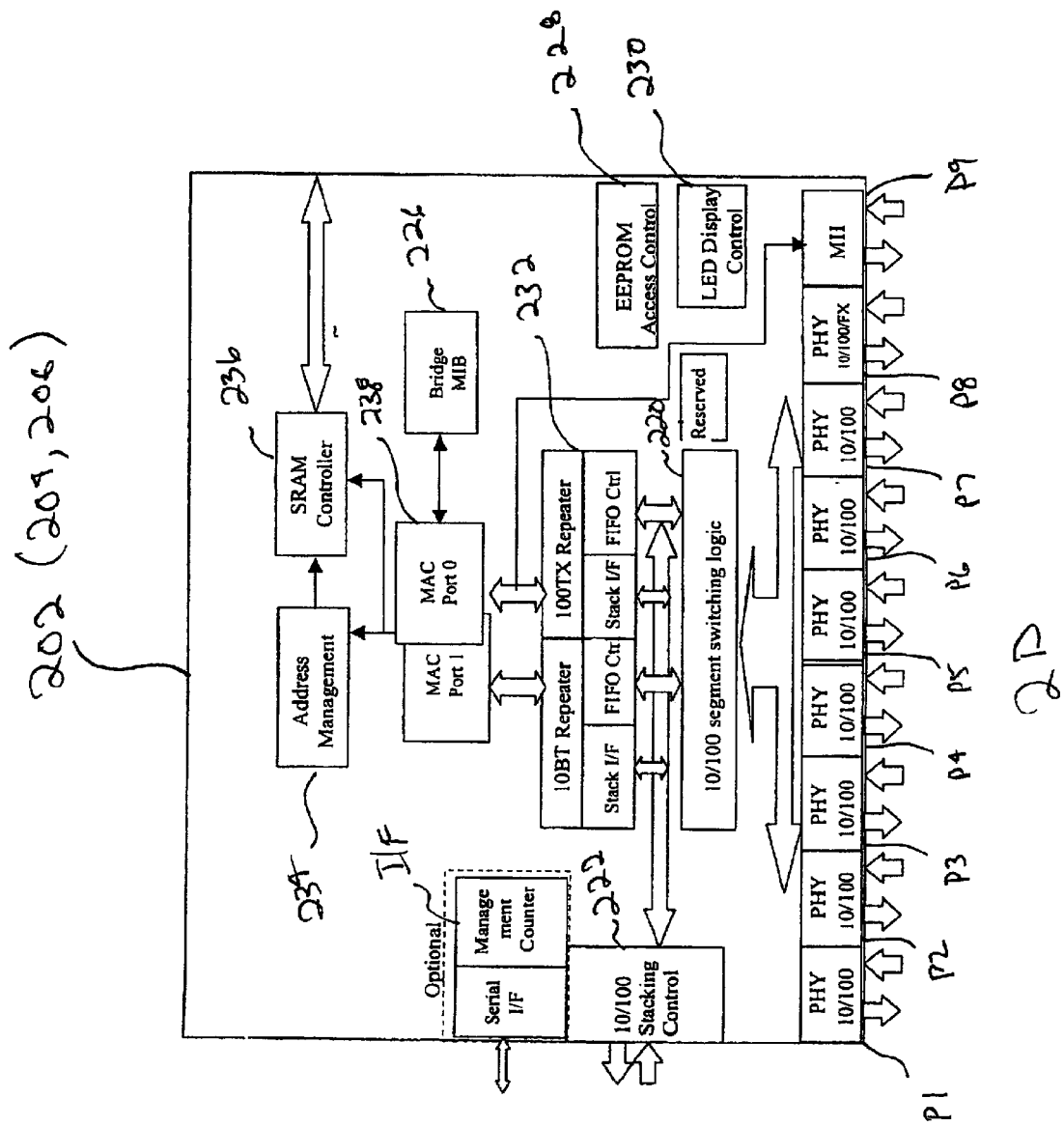

METHODS AND CIRCUITS FOR STACKING BUS ARCHITECTURE

PRIORITY CLAIM

This application is a continuation-in-part of, and claims priority to, co-owned, U.S. patent application Ser. No. "09/416,365", entitled "METHODS AND CIRCUITS FOR STACKING BUS ARCHITECTURE" filed on Oct. 8, 1999 now abandoned, which itself claims priority to Provisional Application Ser. No. 60/103,813 filed Oct. 8, 1998, entitled "THE STRUCTURE OF STACKING BUS USING IN TRex8-R". The contents of these earlier filed applications are hereby incorporated by reference.

BACKGROUND OF THE INVENTION

1. Field of the Invention

The present invention relates to network devices, circuitry, and architecture. More particularly, the present invention relates to repeater circuits and stacking bus architectures used within 10 MB or 100 MB Ethernet other computer data networks.

2. Description of the Prior Art

Ethernet is an example of a well-known and popular standard for facilitating communication between devices and machines within information networks. Data networks such as Ethernet is so widely used that it is almost impossible to find an office in the United States that does not employ several Ethernet LANS (local area networks) used to facilitate its day-to-day business operations.

Typically, within a data network, devices are connected to one another via a wire, such as category 5 (CAT 5) or twisted pair 10 BASE-T wires that are flexible and allow for easy cable pulling through building walls, ceilings, etc. Ethernet relies on a communication protocol called Carrier Sense Multiple Access Collision Detect (CSMA/CD). Each station within an Ethernet network is connected to a single wire used to both transmit and receive data. The Carrier Sense of CSMA/CD means that before transmitting data, a station must check the wire to see if any other station is already sending data. Accordingly, a station will typically only send data when the LAN appears to be idle (i.e., no signals coming in).

Cables used within Ethernet networks have physical limitations that must be accounted for in a network architecture. For example, an Ethernet station in a 10 MB Ethernet network sends data at a rate of 10 MB per second. At this rate, a bit travels approximately 100 feet down a network cable before the second bit is sent. So, if two stations are located 250 feet apart, for example, and both begin transmitting at the same time, then each station will be in the middle of sending its third bit before the signal from each other reaches the other station. When two signals are sent onto the same network segment at the same time, a collision occurs and the signals are lost. Therefore, there is a need for Collision Detection.

Another problem caused by the physical nature of cable causes within the network topology is signal attenuation. The resistivity of copper cable or wire causes signals to attenuate over a certain distance such that an Ethernet station receiving a data packet may not be able to accurately read each and every bit of the data pack (an Ethernet packet has a well-known structure that includes a preamble, which network devices capture and use to determine what to do with a packet; signal attenuation can make it difficult or impossible to read the preamble). Accordingly, a well-known device called a repeater is used within a network to restore the signal and remove the effects of amplitude distortion caused by signal attenuation and timing distortion caused by jitter, which the signal experiences as it propagates through each network segment.

In its most basic form, a repeater receives data on a physical port and repeats to all of its other ports except the active receiver port on the repeater, restoring signal amplitude and timing on the retransmitted data packets. As explained above, a collision occurs when signals are sent by multiple machines on the same wire. Therefore, another common function that a repeater performs is Collision Detection. If the repeater detects receive activity from two or more ports, this constitutes a collision (i.e., two machines are attempting to send a signal at the same time), and the repeater will send a jam pattern on all ports, including the active receive ports. Reception and retransmission of signals and packets are closely specified in the section, "Repeater Units for 10 MB per Second Base Band Networks" of the IEEE 802.3 standard.

While repeaters are required for Ethernet networks, they introduce some other effects that must be accounted for when building large networks. One such effect is delay. Repeaters introduce delay into the network signal as it propagates signals from one port to another. This delay must be factored into the overall roundtrip delay of the network. Another effect is referred to as "interpacket gap shrinkage" (IPG shrinkage). The main cause of IPG shrinkage is the variability of the delay path through the repeater for back-to-back packets.

In order to understand the effective IPG shrinkage, consider the example in which two packets are issued from a transmitting station with minimum IPG. When the first packet reaches a repeater, the repeater will take a certain amount of time to recognize the signal and pass it to its other ports, therefore introducing a delay. As the delay between packets varies even slightly, as packets are transmitted from repeater to repeater, the gap between packets can be shortened. If the IPG becomes too small, repeaters may not be able to reacquire lock to the incoming packet (by reading the preamble) and may therefore decode some of the packet data incorrectly. The basic outcome of both the repeater delay and the IPG shrinkage issues is that the number of repeaters permitted in the end-to-end path of the network must be restricted.

Accordingly, there is need for expanding the collision domain of repeaters and for minimizing IPG gap shrinkage and delay issues caused therefrom. One way of expanding collision domain is to create a repeater with more ports. However, in order to increase the number of physical ports, the number of repeater circuits (e.g., repeater chips) in a repeater must be increased. A second way of increasing the size of a collision domain is to link repeaters together in such a way that all the ports of each repeater are in the same collision domain. One way of linking multiple repeaters together is via circuitry commonly referred to as a backplane. Backplanes allow repeater manufacturers to cascade multiple repeater circuits into a single hub. In order to allow multiple repeater circuits in a system to behave as a single hub, the repeaters must pass status information in addition to data and clock signals.

Thus, there is a need for new and improved systems and methods for integrating multiple repeaters (and repeater chips) into a single collision domain. Such systems and methods should be able to handle high-speed, low-speed, or mixed-speed management interconnections between repeaters. Also, such systems and methods should be highly versatile with low cost and ease of design.

SUMMARY OF THE INVENTION

In view of the foregoing comments in view of the related art, it is an object of the present invention to solve the aforementioned problems. It is another object of the present invention to provide new and improved systems and methods for expanding the collision domain of repeaters by integrating repeaters (and repeater chips) into a single collision domain without losing signal fairness.

According to a preferred embodiment of the present invention, provided is a system connecting multiple repeaters into a single collision domain comprising a first repeater, a second repeater and a stacking bus. The first repeater includes a plurality of network ports and stack connectors. The second repeater also includes a plurality of network ports and stack connectors. The stacking bus connects the first repeater via the stack connectors of the first repeater to the second repeater via the stack connectors of the second repeater and is configured to relay carrier signals, collision signals and data (i.e., status signals and data packets) between the first and said second repeaters.

According to another preferred embodiment of the present invention, provided is a repeater comprising a master repeater circuit (e.g., a repeater chip), at least one slave circuit (e.g., repeater chip(s)), a local bus, a system bus, a data bus, an upper stack connector, a lower stack connector, and a stacking bus. The master repeater circuit includes a plurality of physical ports, a means for sending and receiving data (including clock) to the data bus, a means for sending and receiving status signals locally (e.g., via the status bus, local bus, etc.) and to and from the stacking bus, and is configured to send and receive signals via its physical ports (i.e., to a network). The slave circuit(s) include a plurality of physical ports, a means for sending and receiving data to the data bus, and means for sending and receiving status signals locally (i.e., to and from the master repeater circuit), and are configured to send and receive signals (e.g., data packets) via their physical ports (i.e., to a network). The local bus connects the master circuit to the slave circuit(s) and allows the master circuit to receive status signals from the slave circuit(s). The system bus connects the master circuit and the slave circuit(s) and allows the master circuit to send status signals to the slave circuit(s). The data bus connects the master and the slave circuit(s) to the two-way buffer. The upper and low stack connectors are configured to transmit data and status signals. The stacking bus connects the master circuit to the upper stack connector and the lower stack connector and connects the buffer to the upper stack connector and the lower stack connector such that status signals from the master circuit is sent and received from the stack connectors, and data to and from the master circuit and the slave circuit(s) is received from and sent to the stack connectors.

According to another embodiment of the present invention, provided is a repeater backplane comprising a chassis and a stacking bus. The chassis includes a plurality of slots each configured to removably receive a repeater. Each slot has a stack connector disposed within each slot configured to connect to a second stack connector of the repeaters (e.g., a repeater is slid into the slot and connects via matching stack connectors, male/female connectors, etc.). The stacking bus is configured to transmit signals between each stack connector.

According to another embodiment of the present invention, provided is a method for expanding the collision domain by integrating a plurality of repeaters, comprising the steps of: at a repeater within the plurality of repeaters, determining if a collision exists; at the repeater, if a collision exists, sending an internal collision signal to all repeaters within the plurality of repeaters at the same time, including itself, each repeater being configured to generate and send a jamming pattern to its physical ports upon receiving the internal collision signal.

According to another embodiment of the present invention, provided is a method for expanding a collision domain in a repeater system comprising a first repeater and a second repeater. The first and second repeaters include a master circuit and a slave circuit connected via a local bus and a system bus. The master circuit and the slave circuit each having physical ports connected to a network. The master circuit of the first repeater and the master circuit of the second repeater are each connected to a stacking bus via a stacking connector. The method comprises the following steps: First, receiving a network signal at a physical port of a slave circuit of the first repeater from the network. Next, sending a local carrier signal to the master circuit of the first repeater via the local bus. Next, upon receiving the local carrier signal at the master circuit of the first repeater, simultaneously sending a second carrier signal to the master circuit of the second repeater via the stacking bus and to itself. Each the master circuit upon receiving the second carrier signal, simultaneously sending a system carrier signal to each the slave circuit and to itself. Upon receiving the system carrier signal, each master circuit and slave circuit repeating the network signal to each physical port.

According to another embodiment of the present invention, provided is a method for expanding a collision domain in a repeater system repeater system comprising at least a first repeater and a second repeater, the first and second repeaters each having a master circuit and at least one slave circuit connected via a local bus, wherein the master circuit and the slave circuit each have physical ports connected to a network, the master circuit of the first repeater and the master circuit of the second repeater are each also connected to a stacking bus via a stacking connector. The method for expanding a collision domain includes the following steps: receiving two network signals at two physical ports of the slave circuit of the first repeater from the network; at the slave circuit of the first repeater, determining that a collision exists; at the slave circuit of the first repeater, sending a local collision signal to the master circuit of the first repeater via the local bus; at the master circuit of the first repeater, upon receiving the local collision signal, simultaneously sending a first collision signal to the master circuit via the stacking bus and to itself; each master circuit upon receiving the first collision signal, simultaneously sending a system collision signal to each slave circuit via the system bus and to itself; and each master circuit and each slave circuit upon receiving a system collision signal, sending a jamming pattern to each physical port according to an Ethernet standard.

BRIEF DESCRIPTION OF THE DRAWING FIGURES

FIG. 2C shows a detailed schematic of a single repeater having a plurality of repeater circuits, each repeater circuit being connected into the same collision domain according to a second embodiment of the present invention;

FIG. 2D Is a block diagram of a chip containing a repeater circuit according to a preferred embodiment of the present invention;

Figure 5A:
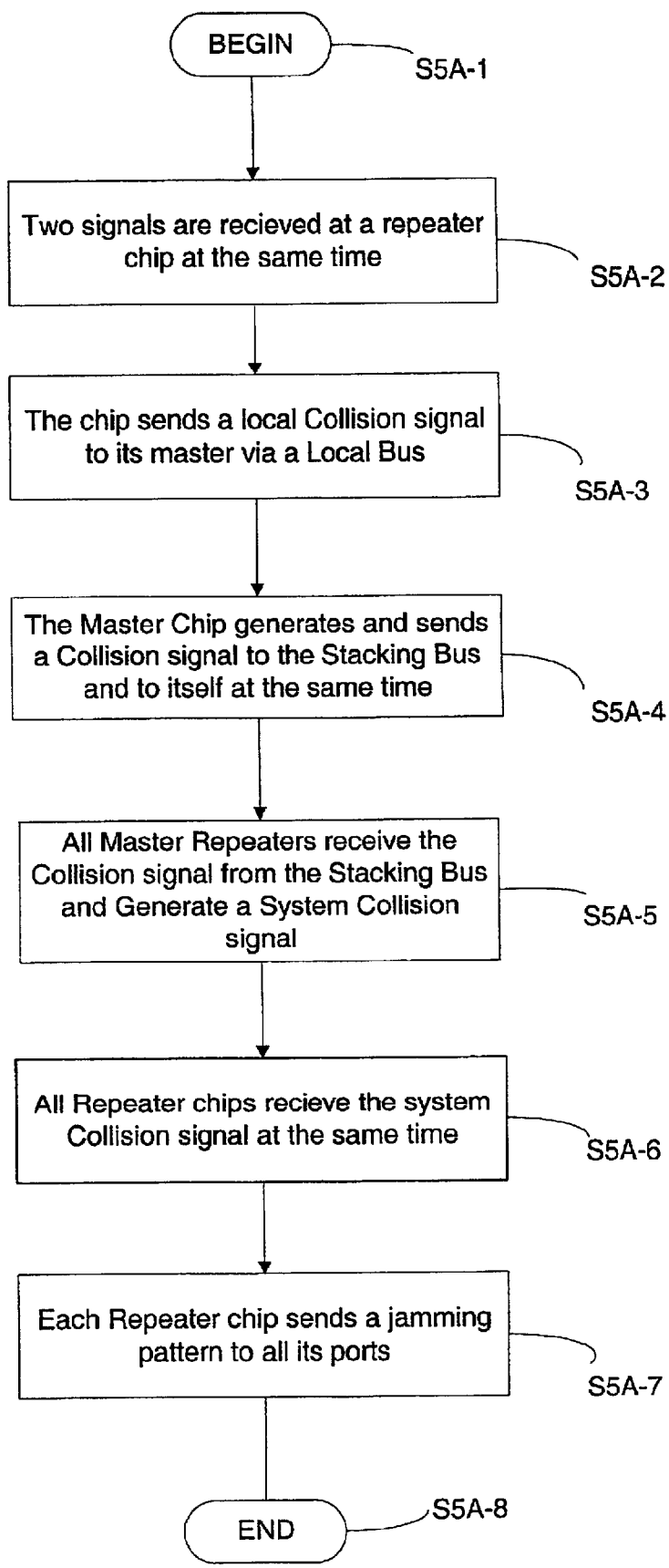
FIG. 5A is a flowchart of a method for detecting and repeating collision signal among several repeaters within the same collision domain when two signals are received from the network by a single repeater chip within a repeater in accordance with the present invention.
Figure 5B:
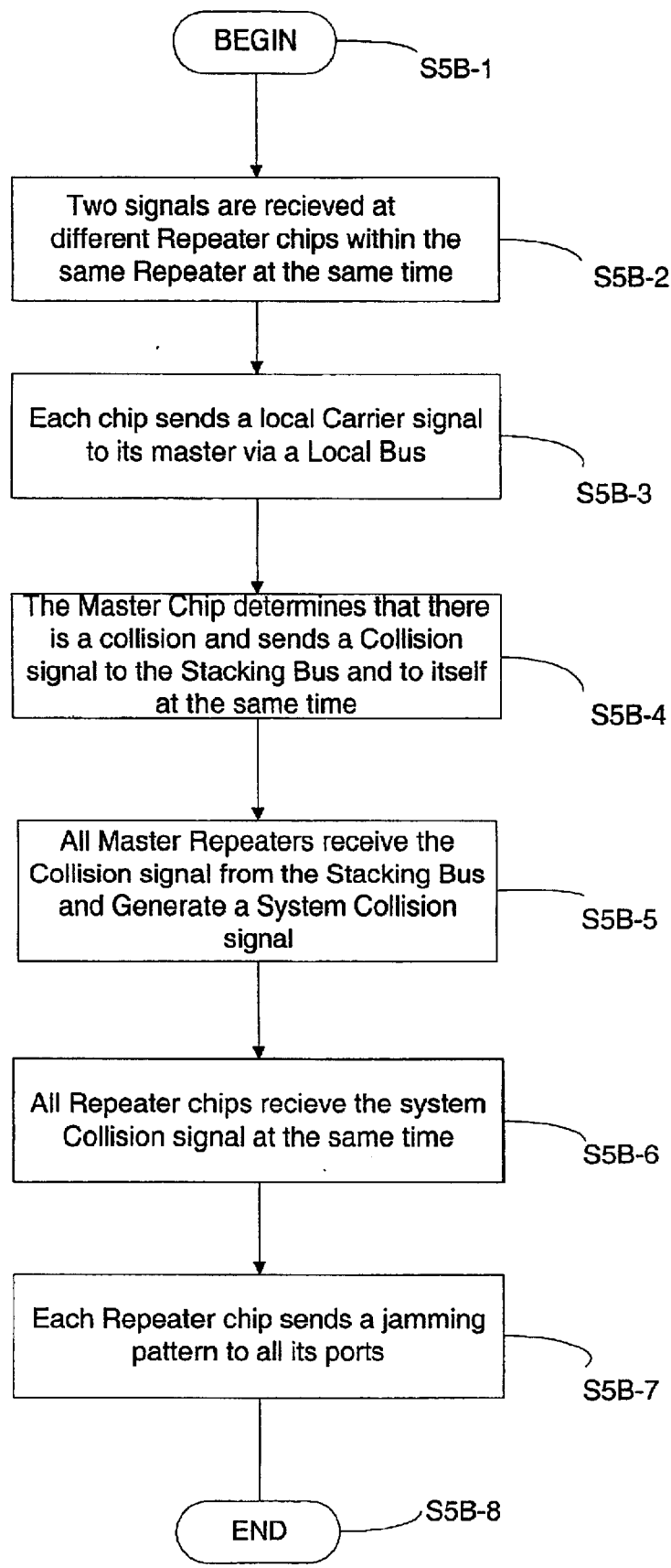
Figure 5C:
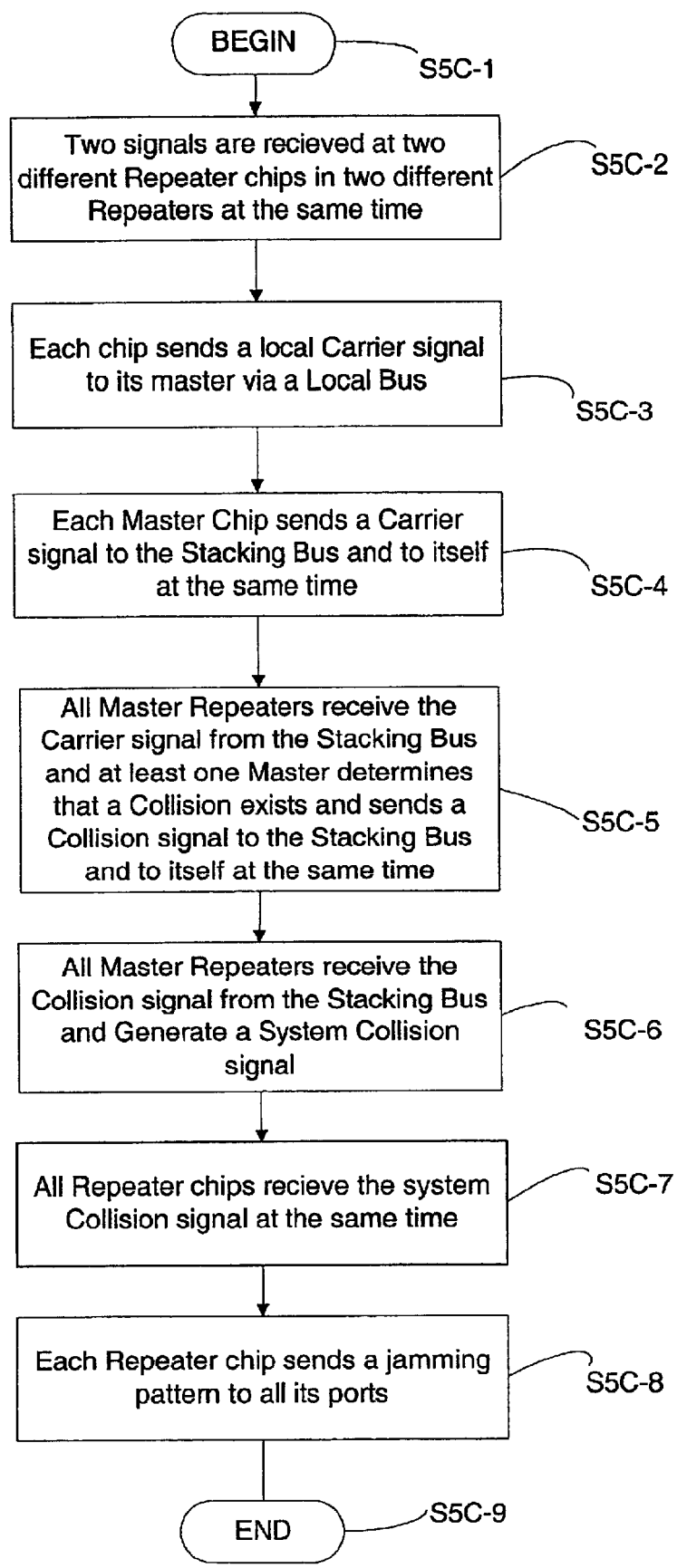

FIG. 5B is a flowchart of a method for detecting and repeating collision signal among several repeaters within the same collision domain when two signals are received from the network by a different repeater chips within the same repeater in accordance with the present invention; and FIG. 5C is a flowchart of a method for detecting and repeating collision signal among several repeaters within the same collision domain when two signals are received from the network by a different repeater chips within different repeaters in accordance with the present invention.

DETAILED DESCRIPTION OF THE PREFERRED EMBODIMENTS

The present invention is discussed with reference to the attached drawing figures. Unless otherwise specified, like parts and processes are referred with like reference numbers.

Figure 1:
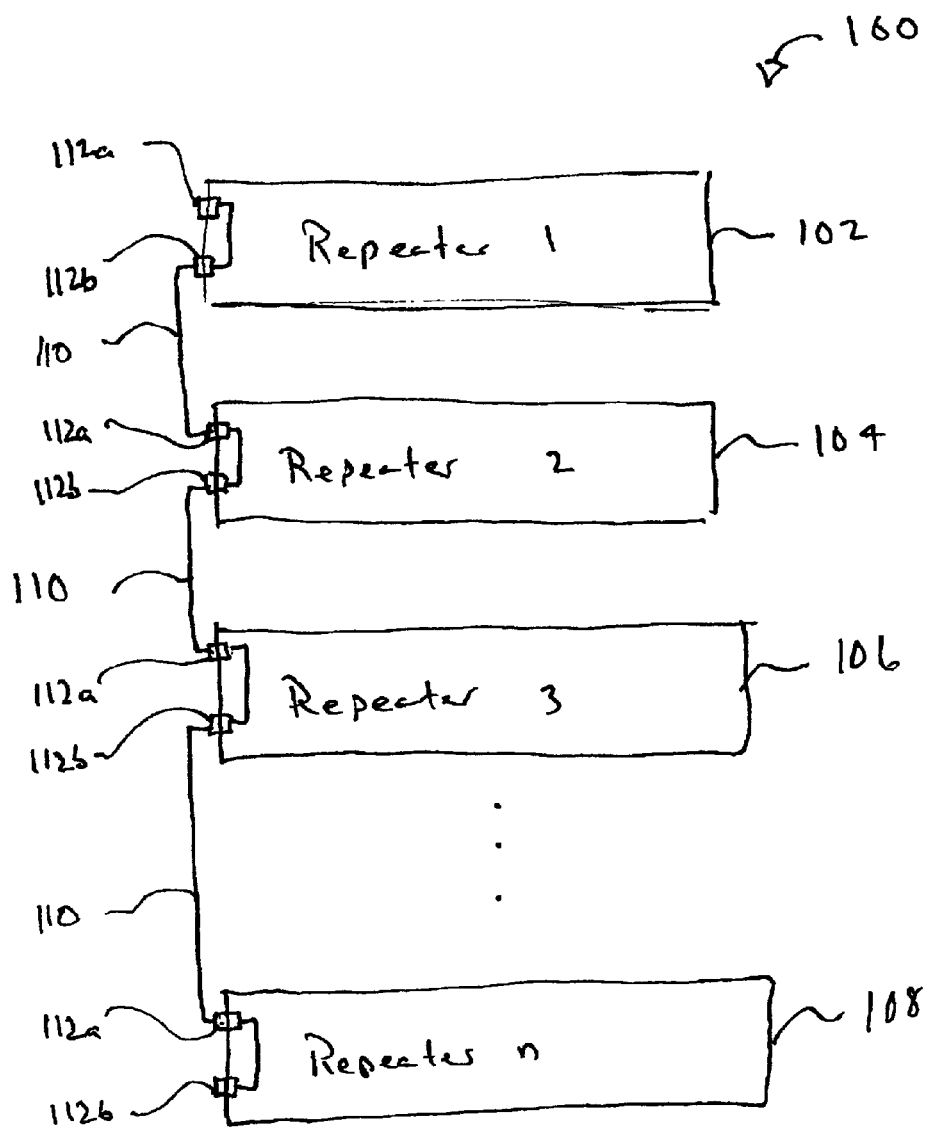
FIG. 1 shows a plurality of repeaters stacked and connected into the same collision domain.

Referring to FIG. 1, a plurality of repeaters are connected into the same collision domain via stacking bus architecture in accordance with the preferred embodiment of the present invention. In particular, system 100 includes a first repeater 102, a second repeater 104, a third repeater 106 and an unlimited number of repeaters up to and including repeater n 108.

Each repeater 102 through 108 may be a commercially available repeater (sometimes referred to as a hub) that is appropriately outfitted and configured to perform according to the appropriate standards (e.g., IEEE 802.3, etc.), repeat signals via its physical ports, to detect collisions across its ports and send corresponding collision signals, and may also be outfitted with appropriate hardware and software to perform various functions such as, scrambling and decoding, auto-negotiation, bridge function, address recognition, media access control, network management, and various other standard repeater functions. An exemplary repeater used may be the AC108 RM 10/100 Mbps Integrated Repeater with Bridge Control, designed and manufactured by ALTIMA COMMUNICATIONS, INC. of San Jose, Calif. That repeater device is shown and described in co-owned and co-pending U.S. patent application Ser. No. 09/416,365 filed on Oct. 8, 1999, which has already been incorporated by reference herein.

Each repeater in the plurality of repeaters is connected to a stacking bus or backplane 110 via two stack connectors 112a and 112b, 112a being an upper stack connector and 112b being a lower stack connector. Note that the stacking bus 110 is shown continuing through each repeater from repeater 102 to repeater 108 because the stacking bus 110 is configured to send certain signals between all repeaters without having to repeat the signal at each repeater. Therefore, the stacking bus can be meant to include both internal and external circuiting when more than one repeater is in a stack. This will be described below with reference to FIGS. 2A to 2D.

The stacking bus 110 (i.e., a stackable expansion structure, such as a chassis and circuitry) and stacking connectors 112a and 112b allow each repeater in system 100 to detect any signal received or any collision detected by any port of any repeater in system 100 at virtually the same time. For example, if the first repeater 102 detects a collision across its physical ports (i.e., the signals received at the same time), first repeater 102 is configured to generate a collision signal to the stacking bus 110 via stack connector 112b (since repeater 102 is the top repeater in the stack, the upper stack connector 112a is terminated) and stacking bus 110 distributes the collision signal to the rest of the repeaters within system 100 to be received with little to no delay. To ensure that repeater 102 receives the collision signal at the same time as the rest of the repeaters within system 100 (i.e., so that the jamming pattern is sent to the physical ports of repeater 102 at the same time as the other repeaters), repeater 102 internally sends the collision signal to itself (i.e., it's pinned to itself such as via a two-way pin) at the same time that it sends the collision signal to the stacking bus 110, therefore ensuring that all repeaters within system 100 receive the collision signal at virtually the same time.

If a data packet is received at a physical port of any repeater in the system, the repeater generates a carrier signal and sends it to each repeater within system 100 via the stacking bus 110. If a repeater receives more than one carrier signal simultaneously (e.g., from the stacking bus 110 and another signal via a physical port from the network, or two separate carrier signals from the stacking bus 110) a collision could be determined.

Figure 2A:
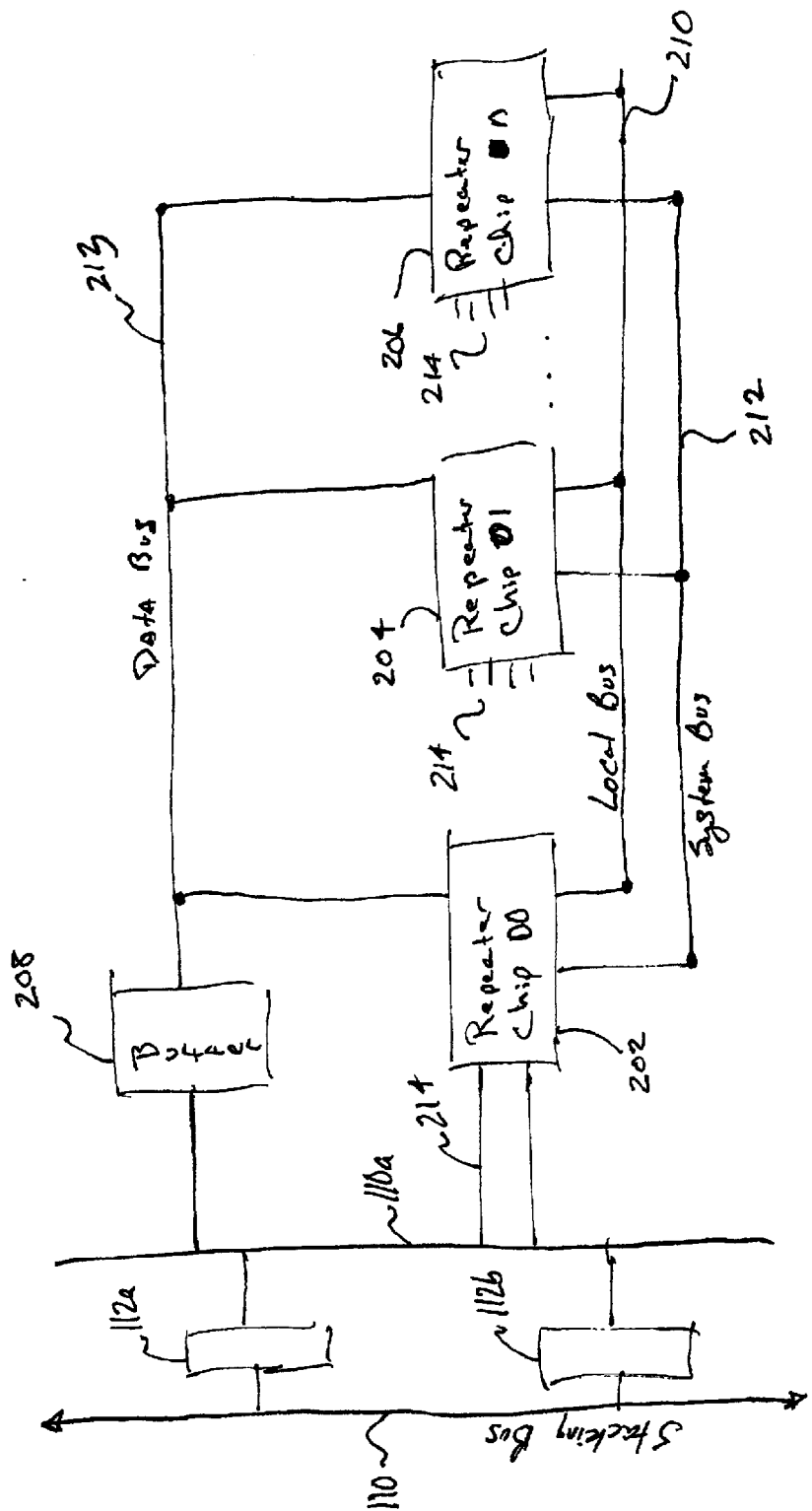
FIG. 2A shows the internal architecture of a single repeater having a plurality of repeater circuits, each repeater circuit being connected into the same collision domain.

Referring now to FIG. 2A, shown therein is a logical block diagram of the internal architecture of an exemplary repeater 102 having multiple repeater circuits—shown here as chips (printed circuits) and being configured to incorporate each repeater into a single collision domain, and which itself may be incorporated into a single collision with other repeaters. The term repeater chip and circuit are used throughout this document inter-changeably. It is not intended to limit the present invention to repeater circuits formed on semi-conductor chips, and the present invention extends to repeater circuits of any configuration.

Figure 2B:
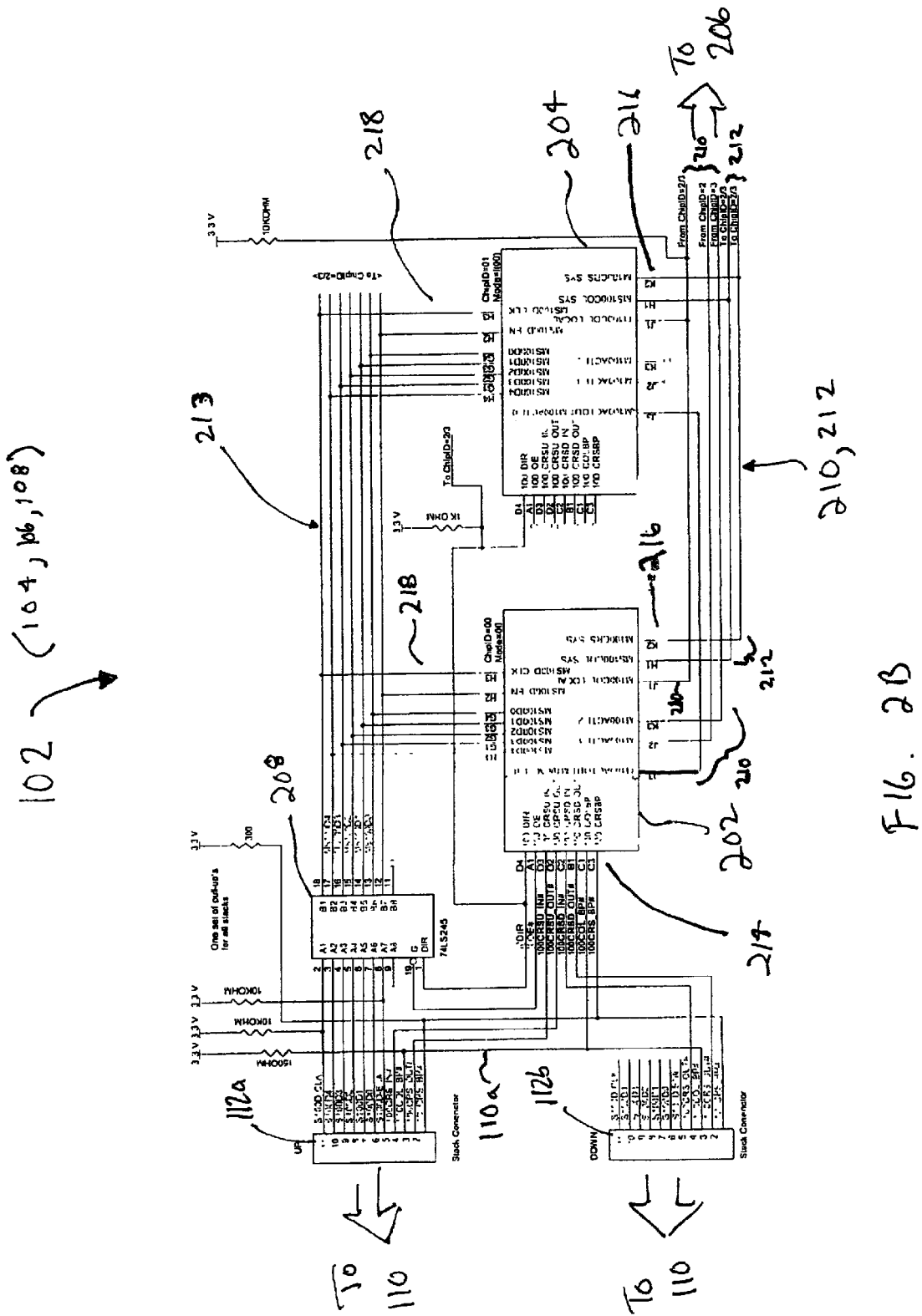
FIG. 2B shows a detailed schematic of a single repeater having a plurality of repeater circuits, each repeater circuit being connected into the same collision domain according to one embodiment of the present invention.
Figure 7B:
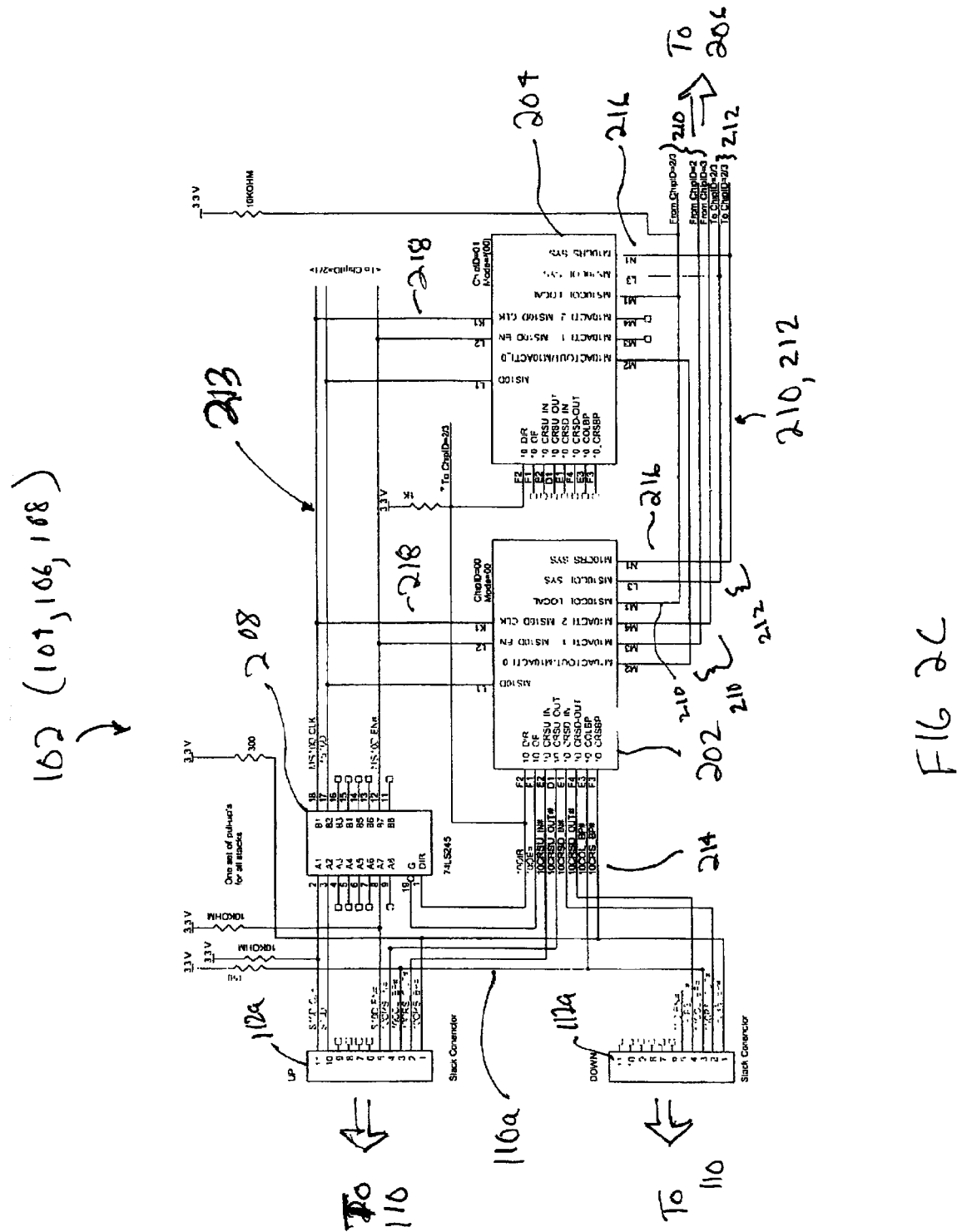

Repeater 102 includes repeater chips 202, 204 and 206 (shown here as chips '00', '01' and up, through, and including chip 'n') coupled to a local bus 210, to a system bus 212, to a data bus 213, and having physical ports (not shown). In repeater 102, one repeater chip is designated as the master or chip 00 (usually the first chip in the repeater), and the remaining chips are designated slave chips (01, 02 ... n). Each chip may be configured to connect to the stacking bus 110 via pins 214 or by any other known means. Shown here, each repeater chip 202–206 is physically the same chip only configured to act as master and slave. Therefore, only the master chip 202 is physically connected to the stacking bus 110, and pins 214 are left floating for the remaining chips. Accordingly, master chip 202 is connected to stack connectors 112A and 112B via its pins 214 via a circuit (examples are shown in FIGS. 2B and 2C). The stack connectors 112A and 112B, in turn, connect the master chip 202 to the stacking bus 110 which allow the master chip 202 to collect information about the status of other repeaters 102 from the stacking bus 110. The embodiment shown is exemplary and is not meant to limit the present invention. For example, the master repeater circuit could be physically different than the slave circuits (e.g., different chips or not chips at all).

When a data packet is received by any repeater chip via its physical ports (i.e., from the network), the chips are configured to notify (e.g., send a status signal such as a carrier signal) master chip 202 of the incoming signal via local bus 210. Accordingly, each repeater chip is connected to local bus 210 and to the system bus 212 which allow master/slave status communications. The local bus 210 allows the master chip 202 to collect local status information (e.g., local collision signal, local carrier signal) from the slave chips 204–206 while the system bus 212 allows the master chip 202 to send system status information (e.g., system carrier signal, system collision signal, etc.) to the slave chips 204–206. Thus, each master chip 202 is configured to collect status information from the stacking bus 110 and the local bus 210 in order to determine system status.

Repeater 102 also includes a two-way buffer 208 that is used to drive and amplify signals (i.e., data packets, etc.) to and from the stacking bus 110 and is coupled to stack connectors 112A and 112B and to data bus 213, which in turn is coupled to chips 202–206, such as by via pins or other means. Each chip is coupled to data bus 213 in order to send the data packets received from the network to the other repeaters to be repeated. Data signals are driven onto the data bus 213 by a chip and amplified by two-way buffer 208 which send and receives data to and from the stacking bus 110 via the stack connectors 112a and 112b.

An internal circuit 110a is shown connecting the stack connectors 112a and 112b as well as the master repeater chip 202 and buffer 208. As will be explained further below, this allows certain signals, such as a system collision, to be sent directly up and down the stack of repeaters to all repeaters, while other signals are sent only to the repeater above (via stack connecter 112a) or the repeater below (via stack connector 112b).

Referring now to FIG. 2B, shown is a schematic of a single repeater having a plurality of repeater chips, each repeater chip being connected into the same collision domain according to one embodiment of the present invention. In this embodiment of the present invention, shown is a 100 MB repeater with stacking bus. The repeater includes a first repeater chip 202, a second repeater chip 204, and third and fourth repeater chips (not shown). Chip 202 acts as the master chip and has pins 216 for sending and receiving local status information via local bus 210 and system bus 212 to and from the other repeater chips that act as slave chips. Each chip is configured to receive and send data to and from the data bus 213. Data on the data bus 213 is amplified by two-way buffer 208, which may be a commercially available data-buffer, for example, a 74LS245. Data is received and sent to and from the stacking bus 110 (to other repeaters) via stack connectors 112a and 112b. Master chip 202 sends and receives status signals (carrier and collision) to and from the stack connectors (to and from other repeaters, i.e., other master chips, in the stack) via pins 214. Note that internal circuiting 110a connects the upper stack connector 112a directly to the lower stack connector 112b, such that certain signals may pass directly down the stack without having to be repeated. Accordingly, the stacking bus in operation may refer to the internal circuiting 110a, the external bus 110, and both stack connectors 112a and 112b, together as a complete circuit. The operation and configuration of the chips is according to the following tables, which describe the function, purpose and operation of the pins.

| | 100MBPS STACKED BUS FOR BACK-PLANE (STACK MASTER MODE) (pins 214) | | |
|---|---|---|---|
| Pin Name | BGA # | Type | Description |
| 100CRSU_IN# | D3 | I,U | 100M Carrier Sense Up In. Active when carrier is sensed from upper stacks. Only Chip ID 00 (master) needs to be connected. This pin has internal pull up. |
| 100CRSD_IN# | C2 | I,U | 100M Carrier Sense Down In. Active when carrier is sensed from lower stacks. Only Chip ID 00 (master) needs to be connected. This pin has internal pull up. |
| 100CRSU_OUT# | D2 | O,Z | 100M Carrier Sense Up Out. Active when receive activity detected on the current stack. This pin is to be daisy chained with upper stack. The last stack can leave this pin unconnected. When receiving activity detected on the current stack, this pin will be driven low, otherwise it should be tri-stated. 100CRSU_OUT#=! (Local CRS) & M100ACTI_0# & M100ACTI_1# & M100ACTI_2# & 100CRSD_IN# |
| 100CRSD_OUT# | B1 | O,Z | 100M Carrier Sense Down Out. Active when receive activity detected on the current stack. This pin is to be daisy chained with lower stack. The last stack can leave this in unconnected. When receiving activity detected on the current stack, this pin will be driven low, otherwise it should be tri-stated. This pin is to be daisy chained with down stack. The last stack can leave this pin |

-continued

100MBPS STACKED BUS FOR BACK-PLANE (STACK MASTER MODE) (pins 214)

| Pin Name | BGA # | Type | Description |
|---|---|---|---|
| | | | unconnected.<br>100CRSD_OUT#=!(Local CRS) & M100ACTI_0# & M100ACTI_1# & M100ACTI_2# & 100CRSU_IN# |
| 100COL_BP# | C1 | I,O | 100M Collision. Active when collision is detected. This pin is monitored to detect collisions on other devices. When not driven, the master should monitor this in to detect collision detected by the other master. When collision is detected, this pin will be driven low, otherwise it should keep monitoring the signal level. All 100COLBP# pins on the stack should be bused together. The collision conditions are defined as following:<br>100COLBP# = M100COL_LOCAL# & multiple (M100ACTI [2:0]# & !(Local CRS) & 100CRSU_IN# & 100CRSD_IN#).<br>When not driving, the master should monitor this pin to detect collision condition. |
| 100CRS_BP# | C3 | I,O,U | 100M Carrier Sense BackPlane. Active low when CRS is detected. This pin is monitored to detect CRS on other devices. When activities are detected, this pin will be driven low, otherwise it should be tri-stated. All 100CRSBP# pins on the stack should be bused together. This pin has internal weak pull up resistor.<br>100CRSBP# = M100ACTI [2:0]# & !(Local CRS) & 100CRSU_IN#) & 100CRSD_IN#.<br>When not driving, the master should monitor this pin to detect carrier condition detected by other master. |
| 100OE# | A1 | O | 100M Output-enable. Control in to enable an external buffer. |
| 100DIR# | D4 | O | 100M Direction. Active-low output direction control pin to control high. When the current stack is active, this signal is low. Therefore, putting data out on the stacking bus. Needs pull-up on this pin. Need to tie all the 100DIR pins together when more than repeater are cascade together. Input/output direction control pin to control the external buffer device. This pin is high for input as default, and low when the current stack is putting data on the stacking bus, which is: M100ACTI [2:0]# & !(Local CRS) is asserted and 100COLBP# is inactive. |

100 Mbps Internal Stacking Bus (pins 216 and 218)

| Pin Name | BGA # | Type | Description |
|---|---|---|---|
| M100COL_LOCAL* | J1 | I/O,Z,U | 100M Local Collisions. Input when ChipID=00. Active low to indicate collision on all other ChipIDs. As the Chip ID !='00', the collision happened by sensing multiple active ports within the chip, this low active signal will be asserted, otherwise, this pin should be tri-stated. When the Chip ID is '00', this becomes an input pin. So, M100COL_LOCAL#=!(local collision). |
| M100ACTO# | J3 | I/O,U | Output to ChipID = 00 for ChipID != 00 to signal local activity. This signal is pure combinational logic and is not in sync with any clock source. (see next 3 signals) |
| M100ACTI_0* | J3 | I/O,U | Input for ChipID=00 from ChipID!= 00 M100ACTO* pins to indicate activities. Open on all other Chip IDs (slave chips). |

-continued

100 Mbps Internal Stacking Bus (pins 216 and 218)

| Pin Name | BGA # | Type | Description |
| --- | --- | --- | --- |
| M100ACTI_1* | J2 | O,U | Connected from ChipID=00 to ChipID=10 M100ACTO* to sense activities. Open on all other Chip IDs (slave chips). |
| M100ACTI_2* | K3 | O,U | Connected from ChipID=00 to ChipID=11 M100ACTO* to sense activities. Open on all other Chip IDs (slave chips). |
| M100COL_SYS* | H1 | I/O,U | When Chip ID is '00', this pin will be driven out the same value as 100COLBP#. The activity of this pin is used only to decide if the collision happens in the system or not. M100COL SYS# = 100COLBP#. |
| M100CRS_SYS* | K2 | I/O,U | ChipID=00 will drive this pin the same as 100CRSBP* to indicate local activity. When Chip ID is > '00', this pin will be driven out the same value as 100CRSBP#. The activity of this pin is to decide if the carriers are sensed in the system or not. M100CRS_SYS# = 100CRSBP#. |
| MS100D4 | H4 | I/O | Multiple/Stacked Data Group. Transmit and |
| MS100D3 | G1 | I/O | receive data in de-scrambled SB data |
| MS100D2 | G2 | I/O | groups for multiple devices. Data is |
| MS100D1 | G3 | I/O | sampled at the rising edge of MS |
| MS100D0 | G4 | I/O | 100D_CLK and driven out on falling edge of MS100D_CLK. |
| MS100D_EN* | H2 | I/O,U | Multiple/Stacked Data Enable. Active-low when data is valid. Signal is driven out on the falling edge of MS100D_CLK, and sampled at the rising edge of MS100D_CLK. |
| MS100D_CLK | H3 | I/O | Multiple/Stacked Data Clock. The bi-directional non-continuous 25 MHz recovered clock for synchronizing with MS 100D[4:0], & MS100D_EN*. |

As a result of the above configuration, a system is provided that can detect a collision amongst several repeaters and notify all the repeaters at the same time.

Master chips are configured to collect status information from the local bus 210, stacking bus 110, and data from its physical ports in order to determine when a collision exists. The following are several examples to illustrate the operation of the repeater in accordance with the present embodiment.

Example 1, two chips within one repeater receive a packet from the network at the same time. When a chip receives a packet from the network via its physical ports, for example chip 204, the chip sends a local carrier signal (CRS_LOCAL) to the master chip 202 via local bus 210. In the configuration according to FIG. 2B, the master chip 202 has a separate pin 216 (J3, J2, K3) to listen for status signals from each slave chip. Each slave chip drives its J3 pin to send a CRS_LOCAL signal to the master chip 202. Assuming that a second slave chip receives a signal at the same time, for example chip 206, chip 206 would likewise send a CRS_LOCAL signal to master chip 202 via local bus 210. Master chip 202 is configured to determine that a collision exists when it receives two or more signals from pins J3, J2, or K3, or if it receives one signal from pins J3, J2, or K3 and a data packet is received at a port of the master chip 202 at the same time. Once a collision is determined across a single repeater, the master chip 202 sends out a collision signal to the stacking bus 110 to notify the other repeaters within system 100, and to itself at the same time, via pin C1 (100COL_BP). Note that internal circuitry 110a connects stack connectors 112a and 112b so that 100COL_BP (and 100CRS_BP) signal automatically continues to every repeater.

All master chips within all repeaters coupled to the stacking bus 110 receive the collision signal at virtually the same time via pin C1, and upon receiving the collision signal, each master chip sends a system collision signal to all chips within a repeater, including itself, via pin H1 (MS100COL_SYS) via system bus 212. Upon receiving a system collision signal, every chip (slave and master) can send a jamming pattern to the network at the same time.

Example 2, a single repeater chip receives 2 signals at the same time. When a single repeater, such as slave chip e.g., 204, receives two signals at the same time via its physical ports from the network, that chip identifies a collision and sends a local collision signal (100MSCOL_LOCAL) to the master chip 202 via pin J1 via local bus 210. When master chip 202 receives the local collision signal via pin J1, it in turn sends a collision signal to all repeaters via the stacking bus 110 via the upper and lower stack connectors 112A and 112B as already described above, by sending a collision signal (100COL_BP) out of pin C1 such that every master chip within the entire system (collision domain) receives the system collision signal at exactly the same time. Next, each master chip sends a system collision signal via pin H1 to all slave chips, and itself, locally. In this way, every chip within the repeater including the master chip receives a system collision signal at exactly the same time, and the system collision signal is simultaneously sent to the stack connectors, and therefore to any other repeaters within the stack such that all repeaters and repeater chips within the same system will receive a collision signal at substantially the same time.

When a collision signal is received, a chip may be configured to terminate the sending and receiving of data packets via the data bus 213 by tri-stating the pins 218 (disabling the pins by sending a disable signal to input buffer for each pin).

Example 3, a signal is received in two different repeaters within system 100 at the same time. When a signal is received at any repeater chip within any repeater, that chip sends a local carrier signal (carrier sense) to the master chip via pin J3 via local bus 210, as already described above. When a master chip receives a local carrier sense signal from any chip, it automatically sends a carrier signal to the stacking bus 110 via pin C3 (100CRS_BP) which is sent to all repeaters (i.e., also via 110a) within system 100. In addition, the master chip also sends a carrier signal to the upper stack connector 112a to the repeater above it, and to the lower stack connector 112b to the repeater below it, via pins D2 and B1 (100CRSU_OUT, 100CRSD_OUT). Similarly, each master chip is configured to receive a carrier sense signal from the upper stack connector 112a via pin D3 (100CRSU_IN) and from the lower stack connector 112b via pin C2 (100CRSD_IN). As a result, a master chip is able to receive a separate carrier signal from the repeater above it and from the repeater below it. Accordingly, if repeater 102 and repeater 106 receive a signal at the same time, the master chip of repeater 104 will receive a carrier signal at pin C2 and D3 at the same time, and will determine that a collision exists for system 100 even though it did not receive any packets via any ports. The master chip for repeater 104 can then send out a collision signal to all the other repeaters and too itself as already described above. Additionally, a master chip is configured to determine that a collision exists when it receives a carrier signal from the stacking bus and from local bus 210, simultaneously. Also, a master chip can determine that a collision exists when it receives a carrier signal from anywhere and it receives a data packet from the network at the same time. In this example, once a collision is detected, subsequent signaling is the same as in Example 1 and 2.

In view of the foregoing, one having ordinary skill in the art will readily understand the construction and the operation of the present invention after reviewing FIG. 2B along with the preceding tables, which accurately describe examples of the operation and purpose of each pin.

According to a second embodiment of the invention, provided is a 10 MB stacking bus repeater set, which is shown in FIG. 2C. The configuration and various components of this embodiment are equivalent to those in the first embodiment shown in FIG. 2B, and therefore, like reference numerals are used to identify like parts. The most notable difference between the 100 MB stacking bus and the 10 MB stacking bus is that the data bus 213 is only a single bit data bus, and thus, stack connectors 112A and 112B are merely five pin connectors. The 10 MB Stacking Bus uses same methods to detect and propagate status information (carrier sense and collision detection). The following tables describe the operation and purpose of each pin used in this embodiment.

10MBPS STACKED BUS FOR BACK-PLANE (STACK MASTER MODE) (Pins 214)

| Pin Name | BGA # | Type | Description |
|---|---|---|---|
| 10 CRSU_IN* | E2 | I,U | 10M Carrier Sense Up In. Active low when carrier is sensed from upper stacks. Only Chip ID=00 needs to be connected. |
| 10 CRSD_IN* | E1 | I,U | 10M Carrier Sense Down In. Active low when carrier is sensed from lower stacks. Only Chip ID=00 needs to be connected. |
| 10 CRSU_OUT*. | DI | O,Z | 10M Carrier Sense Up Out. Active low when receive activity detected on the current stack, otherwise it is tri-stated. This pin is to be daisy chained with upper stack. The last stack can leave this pin unconnected. |
| 10 CRSD_OUT* | F4 | 02 | 10M Carrier Sense Down Out. Active low when receive activity detected on the current stack, otherwise it is tri-stated. This pin is to be daisy chained with lower stack. The last stack can leave this pin unconnected. |
| 10 COLBP* | E3 | I/O | 10M Collision. Active when collision is detected. All 10COLBP* pins on the stack must be tied together. The master uses this pin to monitor collisions on other devices. |

10MBPS INTERNAL REPEATER BUS (pins 216 and 218)

| Pin Name | BGA # | Type | Description |
|---|---|---|---|
| M10COL_LOCAL* | M 1 | I/O,Z,U | 100M Local Collisions. Input on ChipID=00. Active low to indicate collision on all other ChipIDs. M10COL_LOCAL# ~(local collision) |
| M10ACT0* | M2 | I/O,U | Output to ChipID=00 to signal local activity, see next 3 signals) |
| M10ACTI_0* | M2 | I/O,U | Connected from ChipID=00 to ChipID=01 M10ACTO* to sense activities. Open on all other Chip IDs. |

-continued

10MBPS INTERNAL REPEATER BUS (pins 216 and 218)

| Pin Name | BGA # | Type | Description |
| --- | --- | --- | --- |
| M10ACTI_1* | M3 | O,U | Connected from ChipID 00 to ChipID 10 M 10ACTO* to sense activities. Open on all other Chi IDs. |
| M10ACTI_2* | M4 | O,U | Output from ChipID#00 to ChipID=00 M10ACT0* to sense activities. M10ACT0# = M10COL_LOCAL# & !(Local CRS) Open on all other Chip IDs. |
| M10COL_SYS* | L3 | I/O,U | Chip ID 00 will drive this pin the same as 10COLBP* to indicate local collision. M10COL_SYS# = 10COLBP# |
| M10CRS_SYS* | NI | I/O,U | Chip ID 00 will drive this pin the same as 10CRSBP* to indicate local activity. M10CRS_SYS# = I10CRS13P# |
| MS10D | LI | I/O | Multiple/Stacked Data Group. Transmit and receive data in 10BT for multiple devices. Data is sampled at the rising edge of MS10D_CLK and driven out on falling edge of MS10D_CLK. |
| MS10D_EN* | L2 | I/O,U | Multiple/Stacked Data Enable. Active when data is valid. |
| MS10D CLK | K1 | I/O | Multiple/Stacked Data Clock The bi-directional non-continuous 10 MHz recovered clock for synchronizing with MS10D, & MS10D_EN*. |

One having ordinary skill in the art will readily understand that the examples of the first embodiment may be easily applied to the second embodiment.

Referring to FIG. 2D, shown therein is a logical diagram of a repeater chip, such as repeater chip 202 in accordance with a preferred embodiment of the present invention. Repeater chip 202 is an AC108 repeater chip and has physical ports P1–P8, P8 could be a bridge port. Repeater chip 202 includes 10 MB and 100 MB segments switching logic 220, repeater blocks 232, MAC ports 238, a bridge MIB 226, function blocks for address management 234, an SRAM controller 236, optional serial I/F, management counter 224, stacking control block 222, LED display control, LED function control block 230, and EEPROM access control block 228.

Repeater circuits may be a single 8-port 10/100 Mbps integrated repeater with bridge controller, with one additional port to supports management interface. The repeater circuit may be a Class II Repeater that is fully compliant with IEEE 802.3 standards, that provides eight 10/100 Mbps copper media ports. In addition, the 8th port may support either 10/100 TX or 100BASE-FX fiber media via Pseudo-ECL interfaces for uplink function. The repeater may also includes one additional MII interface. The MII interface can be connected to a MAC or a Switch for managed repeater stack or hybrid Switch/Repeater Applications.

Repeater circuits may provide 10/100 Mbps auto-negotiation with parallel detection for all ports. However, a user may optionally configure the technology for each port via an EEPROM interface. The repeater may provide two internal repeater state machines, one operating at 10 Mbps and the other one at 100 Mbps. Once the technology is set, the device automatically connects each port to the appropriate repeater segment.

Repeater circuits may also provide two Back-planes for expansion. One operating at 10 Mbps and one at 100 Mbps.

Regarding the Bridge Function function, the repeater may offer 18-bit address bus for memory access. The SRAM buffer for multi-port repeater includes address look-up table and output queue. The address look-up table can consist of 1 K entries, 2 layers and each entry can occupy 8 words. Therefore, the total can come to 8 K words. Self-learning address recognition scheme is XOR mapping in the normal mode and direct mapping in test mode. For buffer management, each packet occupies 1.5 K, 1536 bytes.

The MII and SNI Interface repeater engine can support SNI for 10 Mb/s and MII for 100 Mb/s. Port 0 of switch engine can support either 10 or 100, while port I supports only at 100 Mbps.

Each repeater can support Store-and-forward scheme. With Store-and-forward, the incoming packet should be completely received to the buffer without error before it can be sent out.

The repeater can support Address Recognition as a self-learning bridge function based on source address field of packets. The repeater uses 2-layer look-up table and XOR hashing in normal mode and direct mapping in test mode. Programmable aging time and fast aging control is supported.

The repeater can support various receive and transmit statuses for simple management. Based management control, system administrator can easily understand the status of switch operations and pertinent configuration setting.

The repeater engine MAC can implement all functions of IEEE 802.3 MAC protocol such as frame formatting, collision handling, etc. Accordingly, it can generate 56-bit preamble and Start of Frame delimiter while a packet is sending. In a half duplex mode, the device can listen before transmitting. This will prevent traffic jams. During collision, a packet will be retransmitted at a random time.

The transmit data on the MII port may be 4-bit nibbles at 25 MHz rate. This data is transferred from the MAC controller into the repeater controller via the MII TXD lines. The MAC controller asserts TX_EN during transmission, or forces an error in the encoded data using TX ER.

In an exemplary clock and data recovery circuit, the equalized MLT-3 signal passes through a slicer circuit that will then convert to NRZI format. The Transceiver of the repeater uses a mixed-signal phase locked loop (PLL) to extract clock information of the incoming NRZI data. The extracted clock is used to re-time the data stream and set the data boundaries. The transmit clock is locked to the 25 MHz clock input while the receive clock is locked to the incoming data streams. When initial lock is achieved, the PLL switches to lock to the data stream, extracts a 125 MHz clock from it and use that for bit framing to recover data. The recovered 125 MHz clock is also used to generate an internal 25 MHz RX CLK. The PLL requires no external components for its operation and has high noise immunity and low fitter. It provides fast phase align (lock) to data in one transition and its data/clock acquisition time after power-on is less than 60 transitions. The PLL can maintain lock on run-lengths of up to 60 data bits in the absence of signal transitions. When no valid data is present, i.e. when the SD is de-asserted, the PLL switches back to lock with TX CLK, thus provides a continuously running RX_CLK.

Figure 2E:
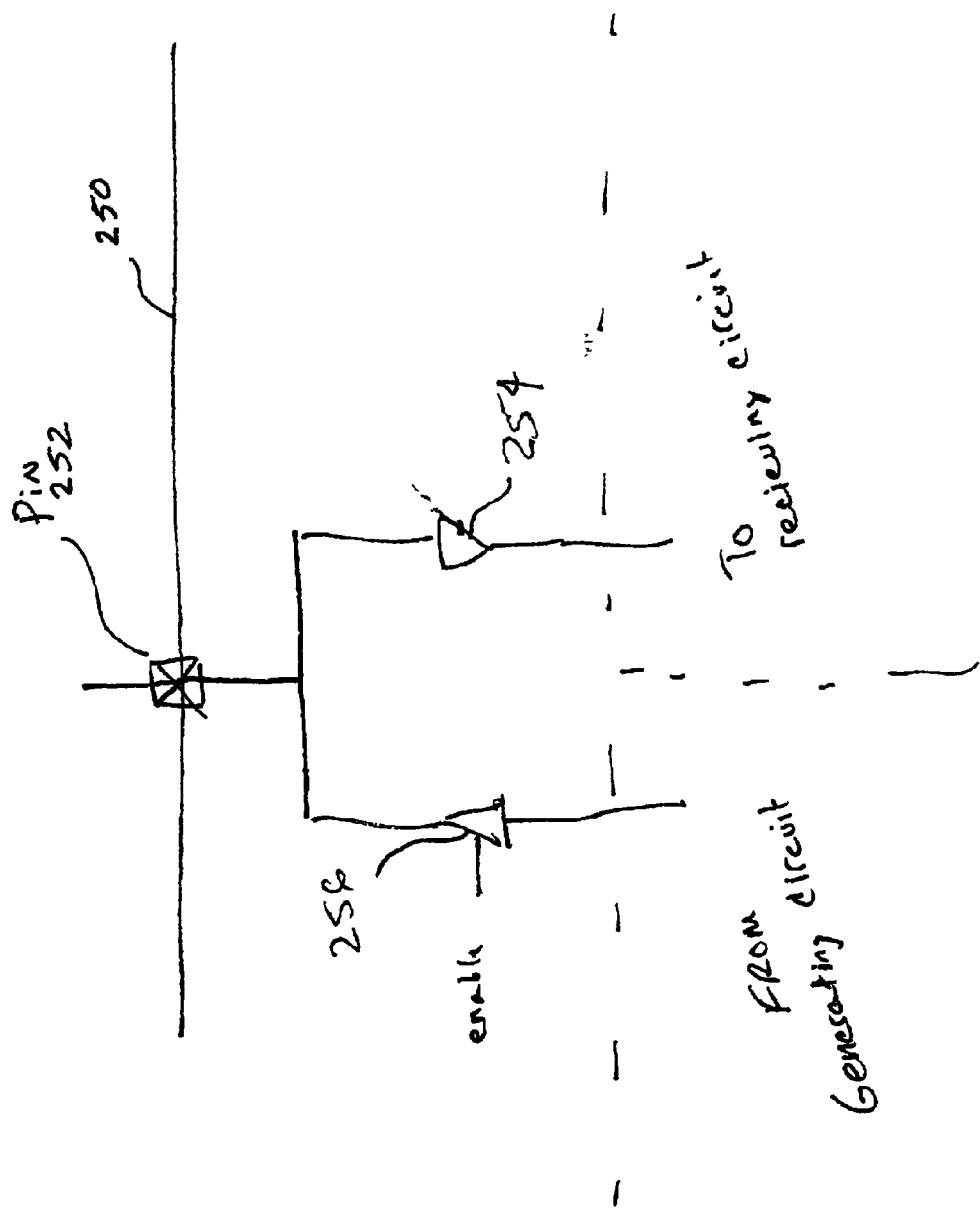
FIG. 2E Is an exemplary two-way pin of a repeater chip according to a preferred embodiment of the present invention.

Referring now to FIG. 2E, shown therein is an exemplary two-way pin, pinned to itself, used in repeater chips to allow a repeater to send a signal to itself. The pin 252 protrudes from the chip 250 as any other pin. An output signal from the generating circuit (e.g., the circuit generating a collision signal to the stacking bus, etc.) is input into a tri-state buffer 256. The output of the tri-state buffer 256 is connected to the pin and to the input of a buffer 254. The output of buffer 254 is input into a receiving circuit for receiving a signal from pin 252. Since the output of the generating circuit is routed outside of the circuit close to the pin 252 through the buffers 254 and 256, a signal sent to itself is received by the receiving circuit at virtually the same time that a corresponding signal would be received from the pin itself.

Figure 3:
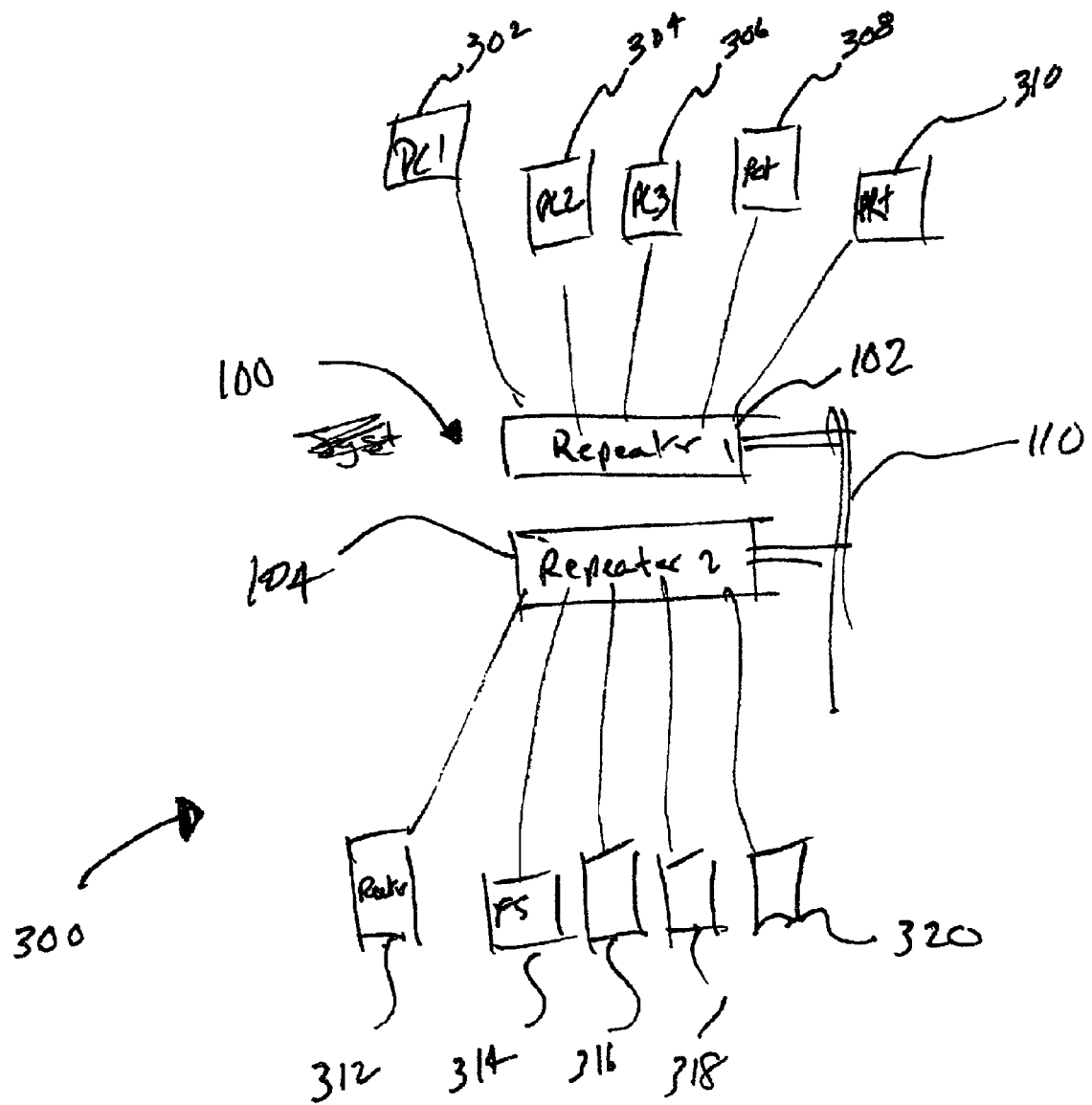
FIG. 3 shows an exemplary network including two repeaters being connected into the same collision domain in accordance with the present invention.

Referring now to FIG. 3, shown therein is an example of a network including two repeaters being connected into the same collision domain in accordance with the present invention. In particular, network 300 includes repeaters 102 and 104 connected via a stacking bus 110 (such as in a chassis), repeater 102 having 3 personal computers (PC1 302, PC2 304, PC3 306), and 2 printers (PRT1 308 and PRT2 310) connected to it via it's physical ports. Similarly, repeater 104 has 5 devices 312–320 networked via it's physical ports. As described above, repeaters 102 and 104 are connected into the same collision domain via backplane 110 and the described logic, and accordingly, if repeater 102 receives a signal from PC1 302 and PC2 304 at the same time, it will recognize a collision, and in accordance with the design described above, a collision signal can be sent to all the repeaters within system 100 and a jamming signal will be sent to all devices within network 300 pursuant to IEEE 802.3 or the appropriate standard, at the same time. Similarly, if repeaters 102 and 104 each receive a signal from the network 300, a collision will still be detected and a collision signal will be sent to all repeaters within system 100, and a jamming signal will be sent to all ports of system 100.

Figure 4:
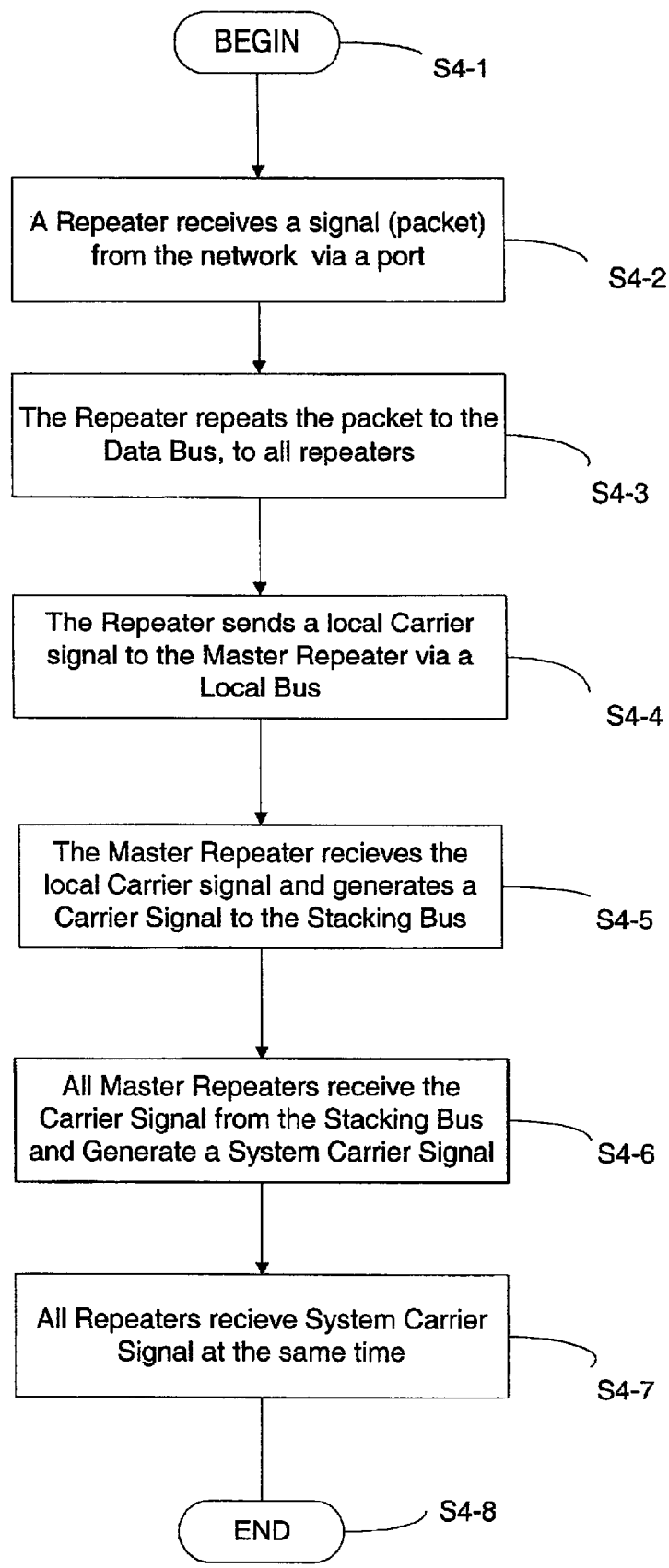
FIG. 4 is a flowchart of a method for repeating a carrier signal among several repeaters within the same collision domain.

Referring now to FIG. 4, a flowchart of a method for repeating a carrier signal among several repeaters within the same collision domain. Processing begins at step S4-1, and immediately proceeds to step S4-2. At step S4-2, in a system such as the one shown and described with reference to FIGS. 1, 2A–2D, and 3, a signal is received by a repeater chip via a physical port. For example, referring back to FIG. 2A, for the purpose of clearly explaining this method, chip 204 may receive a signal via one of its eight physical ports.

Next, at step S4-3, the signal is repeated to all repeaters, such as via the data bus 213. Each repeater chip within the system may buffer the data.

Next, at step S4-4, the repeater receiving the signal, for example chip 204 of FIGS. 2A–2D which is a slave chip to master chip 202, sends a local carrier signal to the master chip 202 via local bus 210 as already described above. Then, at step S4-5, the master chip 202 generates a carrier signal (e.g., 100CRS_BP) and sends it to the entire system via the stacking bus 110 and to itself at the same time. Additionally, as described above in the example with reference to FIGS. 2A–2D, the master chip 202 also sends a separate carrier signal to the repeater above it via the upper stack connector and to the repeater below it via the lower stack connector.

Next, at step S4-6, each master chip within the system receives the carrier signals from the stacking bus and generate corresponding system carrier signals which are sent to all chips within a repeater via the local bus, as already described above. Each chip then receives the system carrier signals at step S4-7, and can repeat the buffered signal to the network. Processing terminates next at step S4-8. Accordingly, provided is a method for integrating several repeaters into a single collision domain. Next is explained a method for detecting a collision amongst several repeaters.

Referring now to FIG. 5A, shown therein is a flowchart of a method for detecting and repeating collision signal among several repeaters within the same collision domain when two signals are received from the network by a single repeater chip within a repeater in accordance with the present invention. Processing begins at step S5A-1 and immediately proceeds to step S5A-2. At step S5A-2, in a system such as the system shown and described with reference to FIGS. 2A–2D, a repeater chip within a repeater receives two or more data packet from the network on its physical ports. As already described above with reference to FIGS. 2A–2D, the repeater chip determines that a collision exists and sends a collision signal to its master (i.e., the master chip within the same repeater) via the Local Bus at step S5A-3.

Next, at step S5A-4, the master chip receives the collision signal and generates and sends a collision signal to the stacking bus and to itself as already described above with reference to FIGS. 2A–2D. If the repeater chip to receive the data packets from the network is the master chip, then it can immediately generate a collision signal to the stacking bus and send it to itself as if it were sent by another repeater chip within the repeater.

Next, at step S5A-5, each master chip within the entire system (i.e., the stack) receives the collision signal from the stacking bus (or itself) at the same time. Each master chip then generates a system collision signal and sends it to all the chips within the corresponding repeater via the system bus 212, as already described above with reference to FIGS. 2A–2D.

At step S5A-6, each repeater within the entire system, receives the system collision signal at the same time, and then, at step S5A-7, each repeater chip sends a jamming pattern to the network via its physical ports, as already described above with reference to FIGS. 2A–2D. Optionally, each chip could tri-state its Pins 218 connected to the data bus 213. Processing terminates at step S5A-8.

Referring now to FIG. 5B, shown therein is a flowchart of a method for detecting and repeating collision signal among several repeaters within the same collision domain when two signals are received from the network by a different repeater chips within the same repeater in accordance with the present invention. Processing begins at step S5B-1 and immediately proceeds to step S5B-2. At step S5B-2, in a system such as the system shown and described with reference to FIGS. 2A–2D, two different repeater chips within a repeater each receive a data packet from the network on a physical port. As described above with reference to FIGS. 2A–2D, each repeater chip sends a Carrier signal to its master (i.e., the master chip within the same repeater) via the Local Bus at step S5B-3.

Next, at step S5B-4, the master chip receives the two carrier signals from the local bus 210 and determines that a collision exists (as described above, each carrier signal is received via a different pin), or, if one of the repeater chips receiving a signal from the network is the master, the master chip determines that a collision exists because it receives a carrier signal at the same time as it receives a data packet from the network. The master chip then generates and sends a collision signal to the Stacking Bus and to itself as already described above with reference to FIGS. 2A–2D.

Next, at step S5B-5, each master chip within the entire system (i.e., the stack) receives the collision signal from the stacking bus (or itself) at the same time. Each master chip then generates a system collision signal and sends it to all the chips within the corresponding repeater via the system bus 210, as already described above with reference to FIGS. 2A–2D.

At step S5B-6, each repeater within the entire system, receives the system collision signal at the same time, and then, at step S5B-7, each repeater chip sends a jamming pattern to the network via its physical ports, as already described above with reference to FIGS. 2A–2D. Optionally, each chip could tri-state its pins 218 connected to the data bus 213. Processing terminates at step S5B-8.

Referring now to FIG. 5C, shown therein is a flowchart of a method for detecting and repeating collision signal among several repeaters within the same collision domain when two signals are received from the network by a different repeater chips within different repeaters in accordance with the present invention. Processing begins at step S5C-1 and immediately proceeds to step S5C-2. At step S5C-2, in a system such as the system shown and described with reference to FIGS. 2A–2D, two different repeater chips within two different repeaters receive a data packet from the network on a physical port. As described above with reference to FIGS. 2A–2D, each repeater chip sends a Carrier signal to its master (i.e., the master chip within the same repeater) via the Local Bus at step S5C-3.

Next, at step S5C-4, each master chip receives the Carrier signal from the local bus 210 and generates and sends a carrier signal (100CRS_BP, 100CRSU_OUT, 100CRSD_OUT) to the stacking bus 110 and to itself as already described above with reference to FIGS. 2A–2D.

Next, at step S5C-5, each master chip within the entire system (i.e., the stack) receives the carrier signal from the stacking bus (or itself) at the same time. At least one master chip will determine that a collision exists. For example, if there are three repeaters within the system, and the top repeater sends a Carrier signal and so does the bottom repeater, the middle repeater in the stack will receive a 100CRSU_IN and a 100CRSD_IN at the same time. Otherwise, if there are only two repeaters, or if the repeaters are not aligned such that a repeater in the stack can receive two carrier signals at the same time, at least one of the master chips will determine a collision because it receives a Carrier signal from the stacking bus 110 and one from the local bus 210 at the same time. The master chip that determines that a collision exists then generates a collision signal and sends it to the stacking bus 110 (and to itself), as already described above with reference to FIGS. 2A–2D.

Next, at step S5C-6, each master chip within the entire system (i.e., the stack) receives the collision signal from the stacking bus 110 (or itself) at the same time. Each master chip then generates a system collision signal and sends it to all the chips within the corresponding repeater via the system bus 212, as already described above with reference to FIGS. 2A–2D.

At step S5C-7, each repeater within the entire system, receives the system collision signal at the same time, and then, at step S5C-8, each repeater chip sends a jamming pattern to the network via its physical ports, as already described above with reference to FIGS. 2A–2D. Optionally, each chip could tri-state its pins 218 connected to the data bus 213. Processing terminates at step S5C-9.

Thus, having fully described the invention by way of example with reference to the attached drawing figures, it will readily be appreciated that many changes and modifications may be made to the invention and to the embodiments disclosed without departing from the scope of the invention as defined by the appended claims.

For example, several different states of operation can be chosen through hardware configuration. External pins may be pulled either high or low at reset time. The combination of high and low values determines the power on state of the device. Many of these pins are multi-function pins which change their meaning when reset ends.

Several different states of operation can be chosen through software configuration as described above.

Repeater functions described above may be inserted into the methods and carried out in the operations describe above. For example, address recognition could be used to repeat a datapacket to a specific port within the system, data may be scrambled and decoded, etc.

What is claimed is:

1. A system connecting multiple repeaters into a single collision domain comprising:
   a first repeater having a plurality of network ports and stack connectors;
   a second repeater having a plurality of network ports and stack connectors; and
   a stacking bus connecting said first repeater via said stack connectors of said first repeater to said second repeater via said stack connectors of said second repeater and configured to relay carrier signals, collision signals and data between said first and said second repeaters, wherein
   upon detecting a collision across one of its network port, said first repeater is configured to generate a collision signal for immediate transmission to said second repeater via said stacking bus and to internally send said collision signal to itself, thereby ensuring that other ports on said first repeater receive the collision signal at the same time as said second repeater.

2. The system according to claim 1 wherein said first repeater is configured to detect a collision across its plurality of network ports and send a collision signal to said second repeater via said stacking bus.

3. The system according to claim 2 wherein said first repeater is configured to send said collision signal to itself via a two-way pin at the same time that it sends said collision signal to said second repeater via said stacking bus.

4. The system according to claim 1 wherein said stacking bus includes a 5-bit databus.

5. The system according to claim 3 wherein said stacking bus includes a 5-bit databus.

6. The system according to claim 1 wherein said first repeater is configured to run 100 MB Ethernet.

7. The system according to claim 3 wherein said first repeater is configured to run 100 MB Ethernet.

8. The system according to claim 7 wherein said first repeater includes a 10/100 MB bridge.

9. The system according to claim 3 wherein said first repeater includes an internal circuit allowing said first repeater to repeat a signal to itself and said stacking bus at substantially the same time.

10. The system according to claim 1 wherein said first repeater is configured to detect a collision when it receives a signal via one of said plurality of network ports and a carrier signal via said stacking bus at the same time.

11. The system according to claim 10 wherein said first repeater is configured to generate a collision signal upon said detection and send said collision signal to itself at the same time that it sends said collision signal to said second repeater via said stacking bus.

12. A repeater comprising:
   a master repeater circuit having a plurality of physical ports, a plurality of pins for sending and receiving signals, and being configured to send and receive signals via said physical ports and pins;
   at least one slave circuit having a plurality of physical ports, a set of pins for sending and receiving signals, and being configured to send and receive signals via said physical ports and pins;
   a local bus connecting said master circuit to said at least one slave circuit such that said master circuit can receive local status signals from said at least one slave circuit,
   an upper stack connector for transmitting data and status signals;
   a lower stack connector for transmitting data and status signals;
   a two-way buffer for receiving and driving data;
   a data bus connecting said master circuit and said at least one slave circuit to each other and to said two-way buffer;
   a system bus connecting said master circuit to said at least one slave circuit such that said master circuit can send system status signals to said at least one slave circuit; and
   a stacking bus connecting said master circuit to said upper stack connector and said lower stack connector and connecting said buffer to said upper stack connector and said lower stack connector such that status signals are transmitted to and from said master circuit to and from said stack connectors, and data to and from said master circuit and said at least one slave circuit is received from and sent to said stack connectors.

13. The system according to claim 12 wherein said master circuit is configured to detect a collision across its plurality of physical ports and send a collision signal to said at least one slave chip via said system bus.

14. The system according to claim 12 wherein said master circuit is configured to send said collision signal to said upper and lower stack connectors via said stacking bus.

15. The system according to claim 12 wherein said upper and lower stack connectors are 12 pin connectors.

16. The system according to claim 12 wherein said master circuit and said at least one slave circuit comprise 10/100 MB dual mode Ethernet repeater chips.

17. The system of claim 12 wherein said at least one slave chip is configured to detect a collision across its plurality of parts and send a first collision signal to said master circuit via said local bus, said master circuit being configured to send a collision signal to said stacking bus upon receiving said first collision and to itself at the same time.

18. The system according to claim 17 wherein said master circuit is configured to send a system collision signal to itself and to said at least one slave circuit via said system bus when said master circuit receives said second collision signal.

19. The system according to claim 17 wherein said pins of said master circuit and said pins of said at least one slave circuit include a first group of pins and a second group of pins, said first group of pins for sending and receiving data packets to and from said data bus and said second group of pins for sending and receiving status signals between said master and slave circuit's via said local bus and said system bus.

20. The system according to claim 12 wherein said master circuit and said at least one slave circuit are configured to run according to a 100 MB Ethernet protocol running a 25 MHz clock, and said data bus includes a 5-bit databus.

21. The system according to claim 19 wherein said master circuit and said at least one slave circuit are configured to run according to a 100 MB Ethernet protocol running a 25 MHz clock, and said data bus includes is a 5-bit databus.

22. The system according to claim 12 wherein said master circuit and said at least one slave circuit are configured to run according to a 10 MB Ethernet protocol running a 10 MHz clock, and said data bus includes a 1-bit data bus.

23. The system according to claim 19 wherein said master circuit and said at least one slave circuit are configured to run according to a 10 MB Ethernet protocol running a 10 MHz clock, and said data bus includes a 1-bit databus.

24. A method for expanding a collision domain comprising the steps of:
   determining if a collision exists at a repeater within a plurality of repeaters coupled to a stacking bus;
   if a collision exists, at said repeater, sending a collision signal to every repeater within said plurality of repeaters via said stacking bus, each repeater of said plurality of repeaters being configured to generate and send a jamming pattern to physical ports thereof upon receiving said collision signal; and
   internally sending, by the repeater determined to have the collision, a collision signal to itself and ensuring that other ports on the repeater determined to have the collision receive the collision signal at the same time as other repeaters.

25. The method according to claim 24 wherein said stacking bus carries a clock signal, a databus, an data enable signal, a system carrier signal and a system collision signal.

26. The method according to claim 25 wherein said clock signal is 25 MHz and said databus is 5-bit wide.

27. The method according to claim 24 wherein said determining if a collision exists step further comprises the step of:
   at said repeater, determining if more than one data packet has been received simultaneously at any of a plurality of ports of said repeater, and
   if more than one packet has been received simultaneously at said plurality of ports, determining that a collision exists.

28. The method according to claim 24 wherein each said repeater of said plurality of repeaters is configured to send a carrier signal to said stacking bus when a signal is received at any of said plurality of ports said determining if a collision exist step further comprises the step of:

at said repeaters, determining that a collision exists when a carrier signal is received from said stacking bus at the same time a signal is received at any port of said repeater determining a collision exists.

29. The method according to claim 25 wherein said clock signal is 10 MHz and said databus is 1-bit wide.

30. The method according to claim 25 wherein each said repeater further comprises a plurality of repeater circuits including one master circuit, connected via a local bus, wherein said collision signal is a system collision signal and each repeater of said plurality of repeaters is configured to receive said system collision signal from said stacking bus and comprising the following steps:

at each said master circuit, sending a local collision signal to said plurality of repeater circuits within each said repeater of said plurality of repeaters via said local bus, each said repeater circuit having physical ports and being configured to send a jamming pattern via said physical ports of each said repeater circuit upon receiving a local collision signal.

31. In a repeater system comprising a first repeater and a second repeater, said first and second repeaters comprising a master circuit and a slave circuit connected via a local bus and a system bus, said master circuit and said slave circuit each having physical ports connected to a network, and said master circuit of said first repeater and said master circuit of said second repeater each being connected to a stacking bus via a stacking connector, a method for expanding a collision domain comprising the following steps:

receiving a network signal at a physical port of a slave circuit of said first repeater from said network;

sending a local carrier signal to said master circuit of said first repeater via said local bus;

at said master circuit of said first repeater, upon receiving said local carrier signal, simultaneously sending a second carrier signal to said master circuit of said second repeater via said stacking bus and to itself;

each said master circuit upon receiving said system carrier signal, simultaneously sending a system carrier signal to each said slave circuit and to itself via said system bus upon receiving said system carrier signal; and each said master circuit and said slave circuit repeating said network signal to each physical port.

32. The method according to claim 31 wherein said stacking bus includes a clock signal, a databus for transferring signals, a data enable signal, a system carrier signal and a system collision signal, and said databus is coupled to each chip within said first and second repeater via a an internal databus.

33. The method according to claim 32 wherein said clock signal is 25 MHz and said databus and said internal databus are 5-bit wide.

34. The method according to claim 32 wherein said clock signal is 10 MHz and said databus and said internal databus are 1-bit wide.

35. The method according to claim 31 wherein each said master circuit is configured to collect carrier signals from said stacking bus and said corresponding local bus and detect a collision if said master circuit receives a carrier signal from said local bus and said stacking bus at the same time.

36. The method of claim 35 wherein each said master circuit is further configured to detect a collision when it receives a carrier signal from any one of said stacking bus and said local bus and a signal at a port of said master circuit at the same time.

37. The method of claim 36 further comprising the steps of:

at said master chip of said first repeater, receiving a carrier signal from said stacking bus an said local bus at the same time;

at said master chip of said first repeater, generating a first collision signal and sending said first collision signal to said stacking bus and to itself at the same time; and at each said master circuit, generating a system collision signal and sending said system collision signal to said slave circuit and to itself via said system bus at the same time.

38. In a repeater system repeater system comprising a first repeater and a second repeater, said first and second repeaters having a master circuit and a slave circuit connected via a local bus and a system bus, said master circuit and said slave circuit each having physical ports connected to a network, said master circuit of said first repeater and said master circuit of said second repeater each being connected to a stacking bus via a stacking connector, a method for expanding a collision domain comprising the following steps:

receiving two network signals at two physical ports of said slave circuit of said first repeater from said network;

at said slave circuit of said first repeater, determining that a collision exists;

at said slave circuit of said first repeater, sending a local collision signal to said master circuit of said first repeater via said local bus;

at said master circuit of said first repeater, upon receiving said local collision signal, simultaneously sending a second collision signal to said master circuit of said second repeater via said stacking bus and to itself;

each said master circuit upon receiving said second collision signal, simultaneously sending a system collision signal to each said slave circuit via said system bus and to itself; and each said master circuit and each said slave circuit upon receiving a system collision signal sending a jamming pattern to each physical port according to an Ethernet standard.

39. The method according to claim 38 wherein said stacking bus includes a clock signal, a databus for transferring signals, a data enable signal, a system carrier signal and a system collision signal, and said databus is coupled to each circuit within said first and second repeater.

40. The method according to claim 39 wherein said clock signal is 25 MHz and said databus and said internal databus are 5-bit wide.

41. The method according to claim 39 wherein said clock signal is 10 MHz and said databus and said internal databus are 1-bit wide.

42. The method according to claim 38 wherein each said master circuit sends said system collision signal via a two-way pin, which is pinned to itself.

43. The method according to claim 38 wherein each said master circuit sends said local system collision signal via a two-way pin, which is pinned to itself.

* * * * *